US012233490B2

(12) United States Patent
Miyajima

(10) Patent No.: US 12,233,490 B2
(45) Date of Patent: Feb. 25, 2025

(54) WELDING POWER SUPPLY

(71) Applicant: DAIHEN Corporation, Osaka (JP)

(72) Inventor: Yuichi Miyajima, Osaka (JP)

(73) Assignee: DAIHEN Corporation, Osaka (JP)

( * ) Notice: Subject to any disclaimer, the term of this patent is extended or adjusted under 35 U.S.C. 154(b) by 288 days.

(21) Appl. No.: 16/435,714

(22) Filed: Jun. 10, 2019

(65) Prior Publication Data

US 2019/0381597 A1    Dec. 19, 2019

(30) Foreign Application Priority Data

Jun. 15, 2018 (JP) .................................. 2018-114433

(51) Int. Cl.
*B23K 9/10* (2006.01)
*H02J 7/00* (2006.01)
(Continued)

(52) U.S. Cl.
CPC .......... *B23K 9/1062* (2013.01); *B23K 9/1043* (2013.01); *H02J 7/0068* (2013.01);
(Continued)

(58) Field of Classification Search
CPC ......... B23K 9/095–0956; B23K 9/1006–1075; B23K 11/24–241; B23K 13/08;
(Continued)

(56) References Cited

U.S. PATENT DOCUMENTS 5,220,151 A * 6/1993 Terayama ............ B23K 9/0956
219/130.32
6,111,216 A * 8/2000 Stava ................... B23K 9/1043
219/130.51
(Continued)

FOREIGN PATENT DOCUMENTS

EP    0538227 A1 * 4/1993 ........... B23K 9/1006
JP    2-235574 A    9/1990
(Continued)

OTHER PUBLICATIONS

English translation to JPH02235574 (Year: 1990).*
(Continued)

*Primary Examiner* — Sang Y Paik
*Assistant Examiner* — Bonita Khlok
(74) *Attorney, Agent, or Firm* — HSML P.C.

(57) ABSTRACT

A welding power supply includes a DC power supply circuit that outputs DC power, an inverter circuit provided with a plurality of switching elements and configured to receive the DC power from the DC power supply circuit and to output AC power, a current sensor that detects output current from the inverter circuit, and a controlling circuit that controls the DC power supply circuit and the inverter circuit. In switching the output polarity of the inverter circuit, the controlling circuit reduces the output of the DC power supply circuit, then provides a short-circuit state by setting all of the switching elements to ON, and then switches a switching element that was ON before the short-circuit state to OFF when the absolute value of an instantaneous value of the output current decreases to or below a threshold value.

6 Claims, 9 Drawing Sheets

(51) Int. Cl.
*H02M 7/06* (2006.01)
*H02M 7/539* (2006.01)
*H02J 7/34* (2006.01)
*H02M 1/00* (2006.01)

(52) U.S. Cl.
CPC ............. *H02M 7/06* (2013.01); *H02M 7/539* (2013.01); *H02J 7/345* (2013.01); *H02M 1/0009* (2021.05)

(58) Field of Classification Search
CPC ......... B23K 37/0258; B23K 9/10–1006; H02J 7/0068; H02J 7/022; H02J 7/345; H02M 7/06; H02M 7/539; H02M 1/0009
USPC ............... 219/130.33, 130.1, 130.32, 137 PS
See application file for complete search history.

(56) References Cited

U.S. PATENT DOCUMENTS

| 8,592,720 | B2* | 11/2013 | Nishisaka | B23K 9/092 219/130.1 |
| 2011/0056923 | A1* | 3/2011 | Berg | B23K 9/1062 219/130.32 |

FOREIGN PATENT DOCUMENTS

| JP | H02235574 | * | 9/1990 |
| JP | 2010-526671 A | | 8/2010 |
| WO | 2008/140398 A1 | | 11/2008 |

OTHER PUBLICATIONS

Search Report received in the corresponding European Patent application, Nov. 14, 2019 (6 pages).

Office Action received in the corresponding Japanese Patent application, Feb. 22, 2022, and corresponding machine translation (8 pages).

* cited by examiner (a)

(b)

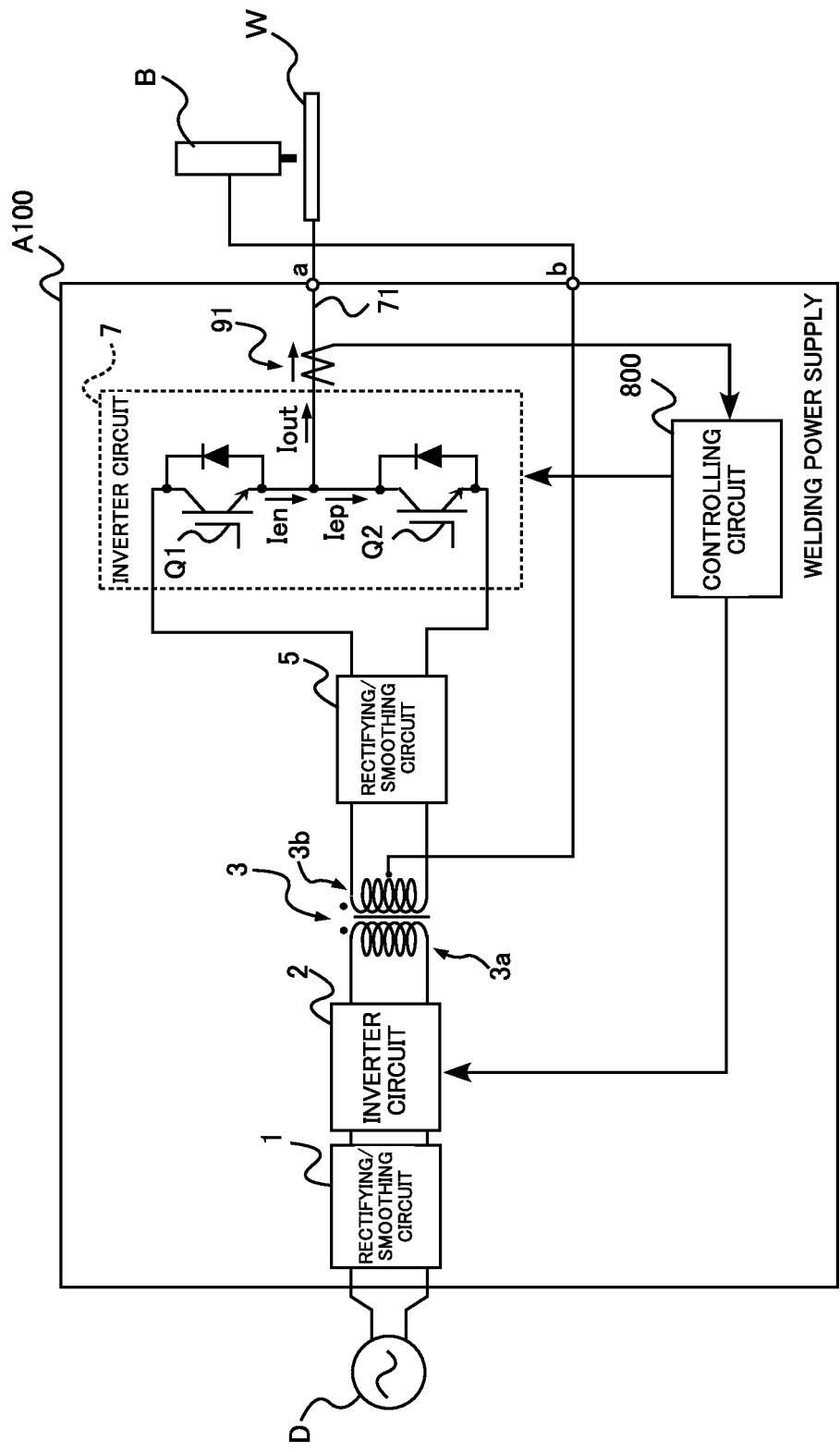
FIG.8 - Prior Art

FIG.9 - Prior Art
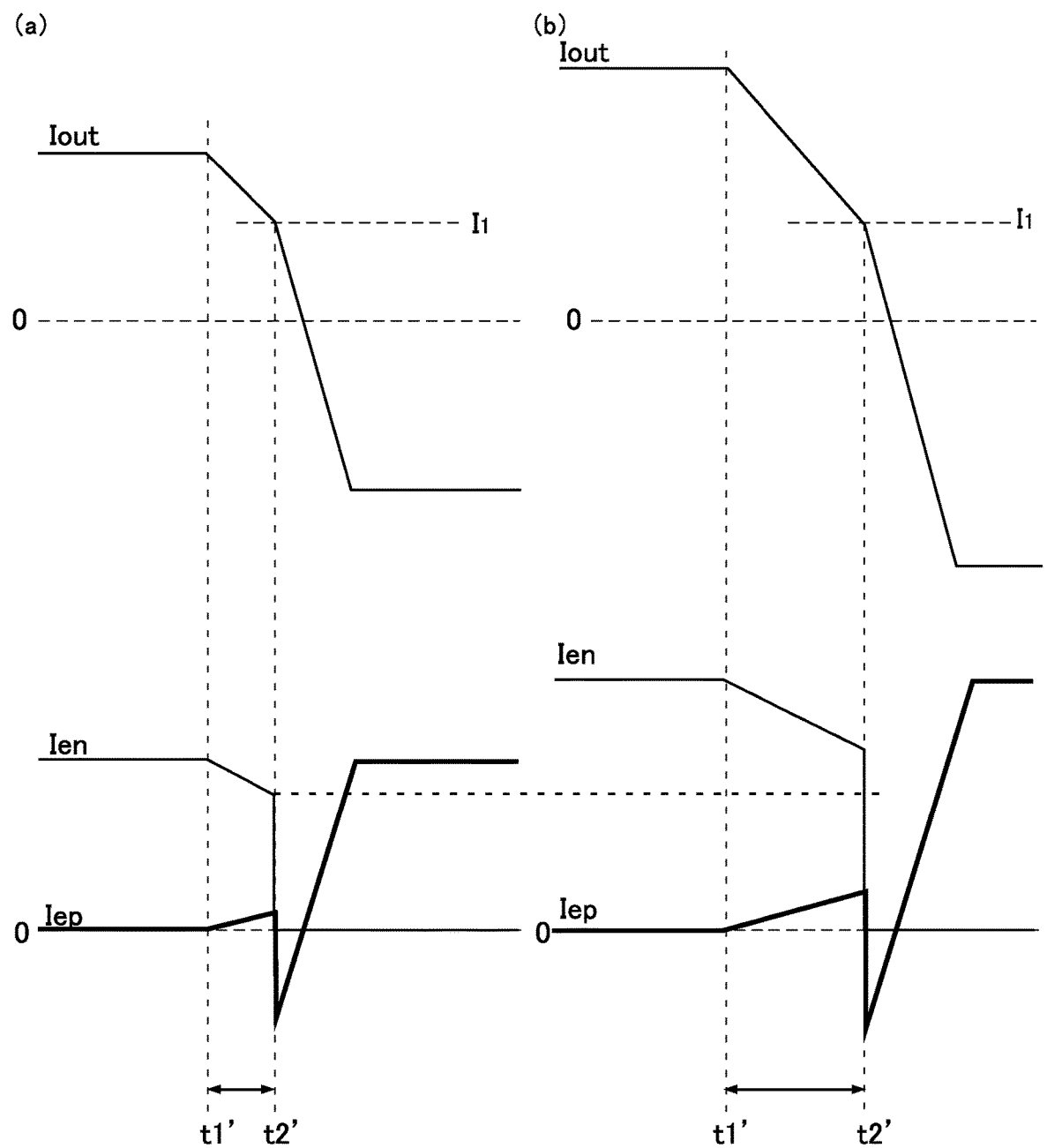

WELDING POWER SUPPLY

FIELD

The present disclosure relates to a welding power supply for AC arc welding.

BACKGROUND

A welding power supply for AC arc welding is known.

FIG. 8 is a block diagram of a conventional welding power supply for AC arc welding and shows the overall configuration of the welding system. The welding system shown in FIG. 8 includes a welding torch B, and a welding power supply A100 for supplying electric power to the welding torch B. In the welding power supply A100, the AC power inputted from the commercial power supply D is converted into DC power by the rectifying/smoothing circuit 1 and then converted into high-frequency power by the inverter circuit 2. The high-frequency power is transformed by the transformer 3 and converted into DC power by the rectifying/smoothing circuit 5. This DC power is converted into AC power by the inverter circuit 7 and outputted from the welding power supply A100. The controlling circuit 800 controls switching of the inverter circuit 2 to perform feedback control so that the output current from the welding power supply A100 follows the target current. Also, the controlling circuit 800 controls switching of the inverter circuit 7 in switching the output polarity of the welding power supply A100.

In the welding power supply A100, when the switching elements Q1 and Q2 of the inverter circuit 7 are switched to OFF in switching the output polarity, an induced electromotive force is generated due to load and cable inductance, causing a surge voltage to be applied to the switching elements Q1 and Q2. Methods for reducing such a surge voltage have been developed. For example, JP-A-H2-235574 discloses a welding power supply configured to reduce the surge voltage. In switching the output polarity, the welding power supply disclosed in this patent document sets both switching elements of the inverter circuit to ON for a certain period of time so that the output of the rectifying/smoothing circuit is short-circuited. Hereinafter, such a period is referred to as a "short-circuit period", and the state where the output is short-circuited is referred to as a "short-circuit state". This process is explained below by referring to the welding power supply A100 shown in FIG. 8. To switch the output polarity, the controlling circuit 800 once sets both switching elements Q1 and Q2 of the inverter circuit 7 to ON to cause a short circuit. Then, after the output current of the welding power supply A100 decreases to or below a predetermined "polarity switching current value", one of the switching elements Q1 and Q2 is switched to OFF so that the intended output polarity is achieved. Herein, the "polarity switching current value" is a threshold for the output current determined in advance such that when the output current is not higher than this threshold, switching the switching element Q1 or Q2 to OFF will not result in a surge voltage exceeding an acceptable range. During the short-circuit period, the controlling circuit 800 suppresses (reduces or stops) the output from the inverter circuit 2 so that the output current reduces quickly. Since the welding power supply A100 switches one of the switching elements Q1 and Q2 to OFF after the output current decreases to or below the polarity switching current value, the surge voltage lies within the acceptable range.

However, if a considerably large value is set as the set value for the output current, a surge voltage exceeding the acceptable range maybe generated. The magnitude of the surge voltage applied to a switching element depends on the magnitude of the current flowing through the switching element. The current flowing through the switching element during the short-circuit period in switching the output polarity is equivalent to the sum of the output current and the current flowing through the other switching element due to the short circuit. Accordingly, the current flowing through the switching element is larger than the output current. Thus, when the switching element is switched to OFF after the output current decreases to or below the polarity switching current value, a current larger than the output current flows through the switching element. If the current flowing through the switching element is only slightly larger than the output current, the surge voltage lies within the acceptable range, because the polarity switching current value as a threshold is set with a certain margin. However, if the current flowing through the switching element is considerably larger than the output current, a surge voltage exceeding the acceptable range may be applied. When the output current set value is large, a long short-circuit period is required. (That is, a longtime is taken for the output current to decrease to the polarity switching current value.) The current flowing through the other switching element due to the short circuit increases with time. Thus, the larger the output current set value is, the larger current flows through the switching element when the switching element is switched to OFF.

This phenomenon is described in more detail with reference to FIG. 9, taking, as an example, the switching from the forward polarity (where the switching element Q1 is ON while the switching element Q2 is OFF) to the reversed polarity (where the switching element Q1 is OFF while the switching element Q2 is ON) in the welding power supply A100 shown in FIG. 8. During the short-circuit period in the illustrated polarity switching process, the current Ien flowing through the switching element Q1 is equivalent to the sum of the output current Iout and the current Iep flowing through the switching element Q2. FIG. 9 illustrates variations with time of the output current Iout, the current Ien and the current Iep in switching the polarity from the forward polarity to the reversed polarity. FIG. 9(a) illustrates the process when the output current set value is small, whereas FIG. 9(b) illustrates the process when the output current set value is large.

Until time t1', the output polarity is the forward polarity, and the output current Iout is controlled to the set value. At time t1', the switching element Q2 is switched to ON so that the output of the rectifying/smoothing circuit 5 is short-circuited. In response to this, the output current Iout starts to decrease. When the output current Iout reaches the polarity switching current value $I_1$ at time t2', the switching element Q1 is switched to OFF. In response to this, the output current Iout decreases rapidly, changes its direction and reaches the set value of the reverse (negative) polarity. The time period from time t1' to time t2' is the short-circuit period. During the short-circuit period, the current Iep flowing through the switching element Q2 gradually increases from zero. The current Ien flowing through the switching element Q1, which is equivalent to the sum of the output current Iout and the current Iep, decreases gradually. Note that when the current Iep has a negative value after the time t2', the current does not actually flow through the switching element Q2 but flows through a diode connected in reverse parallel to the switching element Q2, so that the current flows in the opposite direction of the arrow.

In the process shown in FIG. 9B, a longer time is taken for the output current Iout to reach the polarity switching current value $I_1$ than in the process shown in FIG. 9A, because the output current set value is larger. Accordingly, the short-circuit period (the time period from time t1' to time t2') is longer. This means that the current Iep continues to increase for a longer period of time, resulting in a larger value at time t2' than that in the process of FIG. 9A. Accordingly, the current Ien (=$I_1$+Iep) at time t2' is also larger than that in the process of FIG. 9A.

In this way, the larger the output current set value is, the larger current with a larger difference from the polarity switching current value $I_1$ flows through a switching element when the switching element is switched to OFF (see the current Ien at time t2' in FIGS. 9A and 9B). Thus, when the output current set value is large, a surge voltage exceeding the acceptable range may be generated when a switching element is switched to OFF.

SUMMARY

The present disclosure has been proposed under the foregoing circumstances and aims to provide a welding power supply that prevents the surge voltage from exceeding the acceptable range even when the set value for the output current is considerably large.

According to an aspect of the present disclosure, there is provided a welding power supply for applying an alternating voltage across a welding electrode and a workpiece. The welding power supply includes : a DC power supply circuit that outputs DC power; a first inverter circuit provided with a plurality of switching elements, the first inverter circuit being configured to receive the DC power from the DC power supply circuit to output AC power; a current sensor that detects output current from the first inverter circuit; and a controlling circuit that controls the DC power supply circuit and the first inverter circuit. In switching an output polarity of the first inverter circuit, the controlling circuit reduces an output of the DC power supply circuit, then provides a short-circuit state by setting all of the switching elements to ON, and then switches a switching element (or more than one switching element) that was ON before the short-circuit state to OFF when an absolute value of an instantaneous value of the output current decreases to or below a first threshold value.

Preferably, the DC power supply circuit includes a second inverter circuit, and the controlling circuit stops the output of the DC power supply circuit by stopping switching of the second inverter circuit.

Preferably, the controlling circuit provides the short-circuit state when the absolute value of the instantaneous value of the output current decreases to or below a second threshold after reducing the output of the DC power supply circuit.

Preferably, the welding power supply may further include a voltage sensor that detects an output voltage of the first inverter circuit, and the controlling circuit changes the first threshold in accordance with the output voltage.

Preferably, the second threshold changes in relation to the first threshold.

Preferably, the controlling circuit changes the first threshold to different values for a case where the output polarity is switched from a forward polarity to a reversed polarity and for a case where the output polarity is switched from the reversed polarity to the forward polarity, where the forward polarity is a state in which a potential of the workpiece is higher than that of the welding electrode, and the reversed polarity is a state in which the potential of the workpiece is lower than that of the welding electrode.

According to the present disclosure, in switching the output polarity of the inverter circuit, the controlling circuit reduces the output of the DC power supply circuit for a certain period of time before providing the short-circuit state. Since the inverter circuit is not in the short-circuit state during this period, the output current decreases, with no current flowing through the switching element that is in the off state. In the subsequent short-circuit period, current flows through that switching element, but the resulting increase in current is smaller than when the output of the DC power supply circuit is not reduced before the short-circuit period. Accordingly, the amount of current flowing through the switching element that was ON before the polarity switching is also relatively small. Thus, even when the set value for the output current is large, later switching one of the switching elements to OFF causes only a small amount of current flow through that switching element. Thus, the surge voltage is prevented from exceeding the acceptable range.

DRAWINGS

FIG. 8 is a block diagram of a conventional welding power supply; and

FIG. 9 is a time chart illustrating variation with time of currents in performing switching from the forward polarity to the reversed polarity in a conventional welding power supply.

EMBODIMENTS

Preferred embodiments of the present disclosure will be described below with reference to the accompanying drawings.

Figure 1:
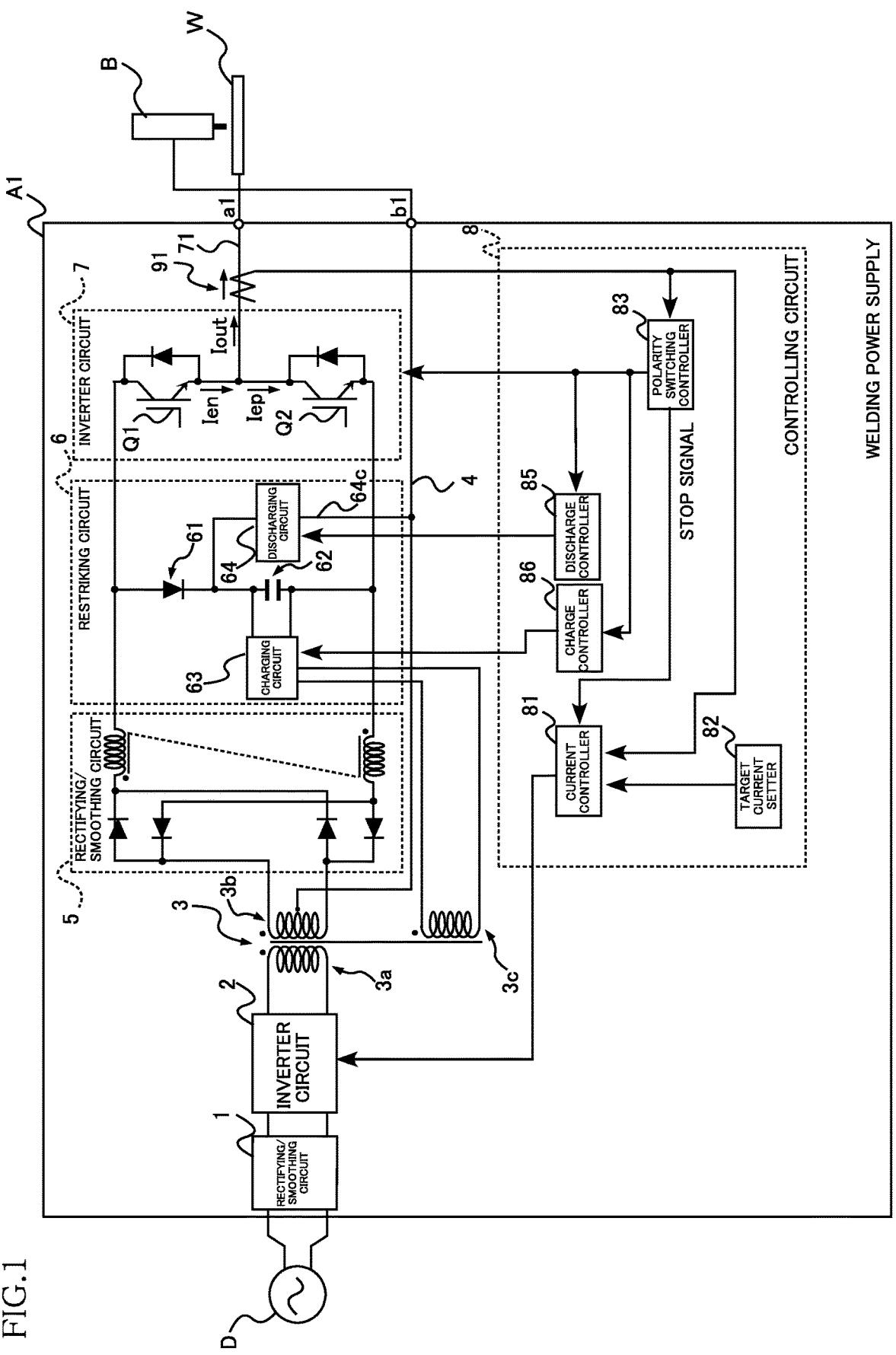
FIG. 1 is a block diagram of a welding power supply according to a first embodiment.
Figure 2A:
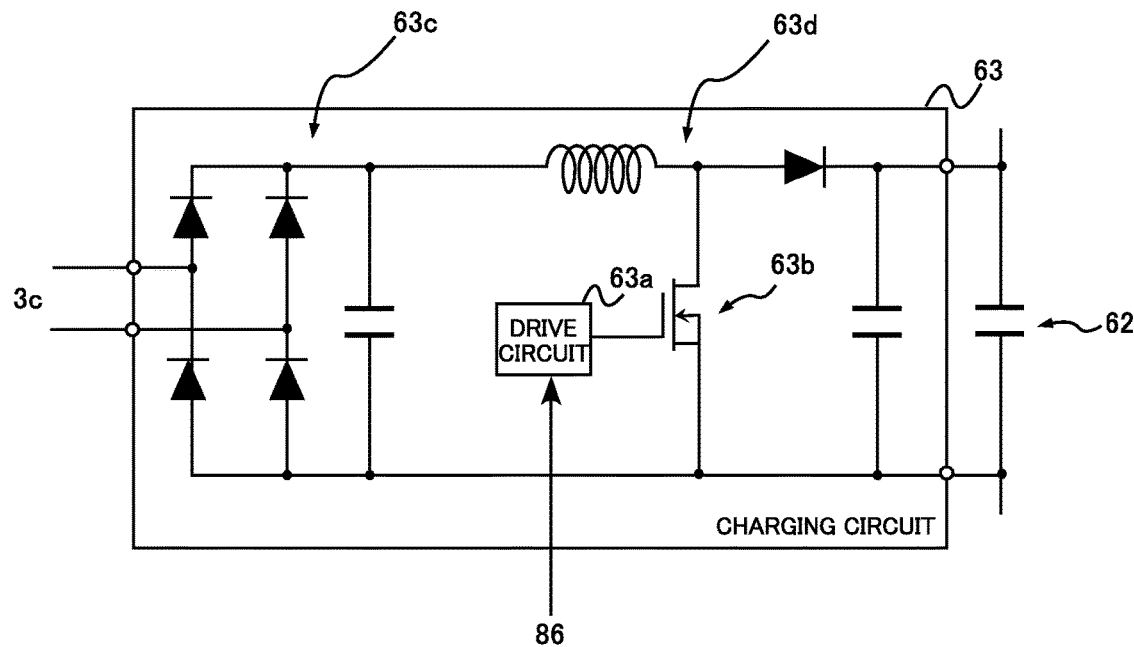
FIG. 2A is a diagram showing a charging circuit according to the first embodiment.
Figure 2B:
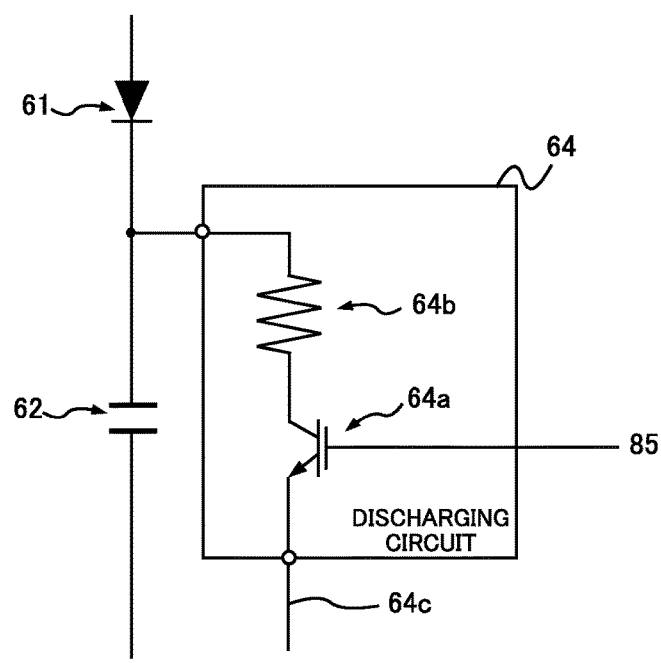
FIG. 2B is a diagram showing a discharging circuit according to the first embodiment.
Figure 3:
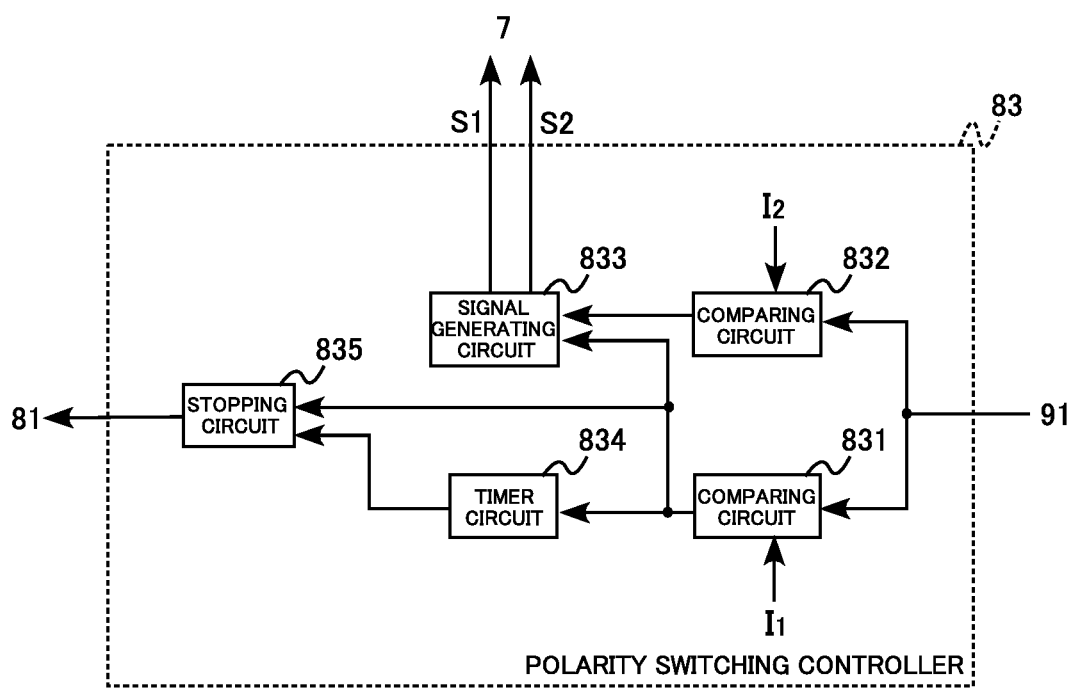
FIG. 3 is a functional block diagram showing an example of the internal configuration of a polarity switching controller according to the first embodiment.
Figure 4:
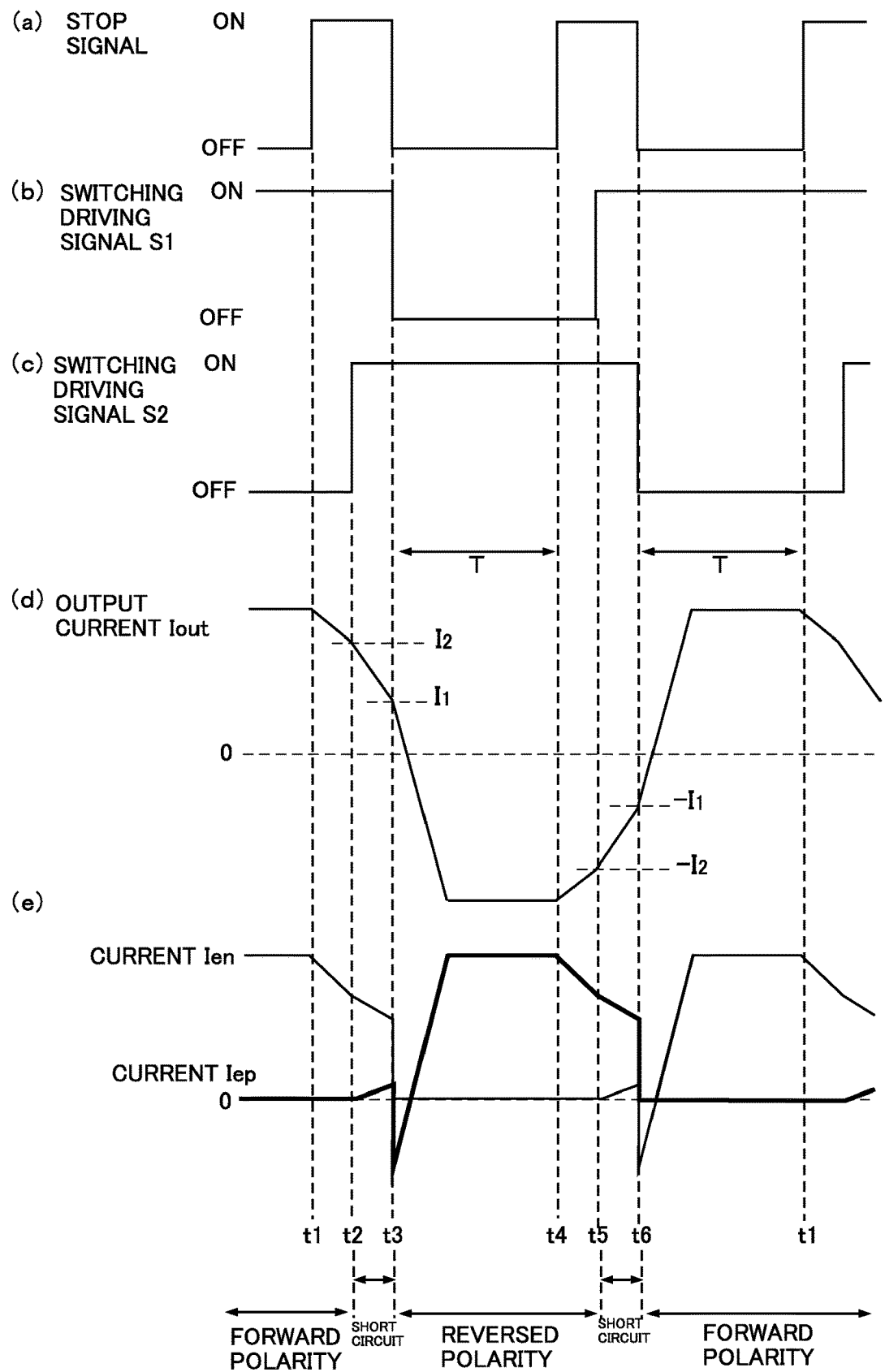
FIG. 4 is a time chart illustrating variation with time of signals and currents for explaining the output polarity switching process in the welding power supply according to the first embodiment.

FIGS. 1-4 are views for explaining a welding power supply according to a first embodiment. FIG. 1 is a block diagram of a welding power supply A1 and shows the overall configuration of the welding system. FIG. 2A is a circuit diagram showing an example of a charging circuit 63 of the welding power supply A1. FIG. 2B is a circuit diagram showing an example of a discharging circuit 64 of the welding power supply A1. FIG. 3 is a functional block diagram showing an example of the internal configuration of a polarity switching controller 83. FIG. 4 is a time chart illustrating variation with time of signals and currents for explaining the output polarity switching process. Note that the vertical axis and the horizontal axis in the time chart may be appropriately magnified or reduced for easier understanding. Also, the waveforms shown in the time chart may be simplified or exaggerated for easier understanding.

As shown in FIG. 1, the welding system includes a welding power supply A1 and a welding torch B. The welding system is an AC TIG (tungsten inert gas) welding system in which the welding torch B utilizes a non-consumable electrode. The welding power supply A1 converts the AC power inputted from a commercial power supply D and outputs the converted power via the output terminals a1 and b1. The output terminal a1 is connected to a workpiece W by a cable. The output terminal b1 is connected to the electrode of the welding torch B by a cable. The welding power supply A1 supplies power to allow arc generation between the tip of the electrode of the welding torch B and the workpiece W. The heat from the arc enables welding.

The welding power supply A1 includes a rectifying/smoothing circuit 1, an inverter circuit 2, a transformer 3, a rectifying/smoothing circuit 5, a restriking circuit 6, an inverter circuit 7, a controlling circuit 8, and a current sensor 91.

The rectifying/smoothing circuit 1 converts the AC power inputted from the commercial power supply D into DC power and outputs the DC power. The rectifying/smoothing circuit 1 includes a rectifying circuit that rectifies an AC current and a smoothing capacitor for smoothing the rectified current. The configuration of the rectifying/smoothing circuit 1 may be varied.

For example, the inverter circuit 2 is a single-phase full-bridge type PWM control inverter and has four switching elements. The inverter circuit 2 converts the DC power inputted from the rectifying/smoothing circuit 1 into high-frequency power by switching the switching elements based on output control driving signals inputted from the controlling circuit 8, and outputs the high-frequency power. The inverter circuit 2 may be a half-bridge inverter or another type of inverter circuit as long as it can convert DC power to high-frequency power.

The transformer 3 transforms the high-frequency voltage outputted from the inverter circuit 2 and outputs it to the rectifying/smoothing circuit 5. The transformer 3 includes a primary winding 3a, a secondary winding 3b and an auxiliary winding 3c. The input terminals of the primary winding 3a are connected to respective output terminals of the inverter circuit 2. The output terminals of the secondary winding 3b are connected to respective input terminals of the rectifying/smoothing circuit 5. The secondary winding 3b is provided with a center tap separately from the two output terminals. The center tap of the secondary winding 3b is connected to an output terminal b1 via a connection line 4. The output voltage from the inverter circuit 2 is transformed in accordance with the winding turns ratio of the primary winding 3a and the secondary winding 3b and inputted into the rectifying/smoothing circuit 5. The output terminals of the auxiliary winding 3c are connected to respective input terminals of the charging circuit 63. The output voltage from the inverter circuit 2 is transformed in accordance with the winding turns ratio of the primary winding 3a and the auxiliary winding 3c and inputted into the charging circuit 63. Since the secondary winding 3b and the auxiliary winding 3c are insulated from the primary winding 3a, the current inputted from the commercial power supply D is prevented from flowing to the circuits on the secondary side or the charging circuit 63.

The rectifying/smoothing circuit 5 converts the high-frequency power inputted from the transformer 3 into DC power and outputs the DC power. The rectifying/smoothing circuit 5 includes a full-wave rectifying circuit that rectifies high-frequency current, and DC reactors for smoothing the rectified current. The configuration of the rectifying/smoothing circuit 5 may be varied.

The inverter circuit 7 may be a single-phase full bridge inverter of PWM control and has two switching elements Q1 and Q2. In the present embodiment, the switching elements Q1 and Q2 are IGBTs (Insulated Gate Bipolar Transistors). Each of the switching elements Q1 and Q2 may be a MOSFET (Metal Oxide Semiconductor Field Effect Transistor), a bipolar transistor, or the like. The switching element Q1 and the switching element Q2 are connected in series to each other, with the emitter terminal of the switching element Q1 and the collector terminal of the switching element Q2 connected to each other. The collector terminal of the switching element Q1 is connected to the input terminal on the positive electrode side of the inverter circuit 7. The emitter terminal of the switching element Q2 is connected to the input terminal on the negative electrode side of the inverter circuit 7. The connection point of the switching element Q1 and the switching element Q2 is connected to the output terminal of the inverter circuit 7. A diode is connected in reverse parallel to each of the switching elements Q1 and Q2. Switching driving signals outputted from the controlling circuit 8 are inputted into the gate terminals of the switching element Q1 and switching element Q2. The output terminal of the inverter circuit 7 is connected to the output terminal a1. In the inverter circuit 7, the switching elements Q1 and Q2 are switched based on switching driving signals inputted from the controlling circuit 8 so as to alternately change the potential of the output terminal of the inverter circuit 7 (the potential of the output terminal a1) between the potential of the output terminal on the positive electrode side and the potential of the output terminal on the negative electrode side of the rectifying/smoothing circuit 5. By this operation, the inverter circuit 7 performs alternate switching between the forward polarity (where the potential of the output terminal a1 connected to the workpiece W is higher than the potential of the output terminal b1 connected to the electrode of the welding torch B) and the reversed polarity (where the potential of the output terminal a1 is lower than that of the output terminal b1). That is, the inverter circuit 7 converts the DC power inputted from the rectifying/smoothing circuit 5 into AC power and outputs the AC power. The inverter circuit 7 may have a configuration different from that described above as long as it converts DC power to AC power.

The restriking circuit 6 is arranged between the rectifying/smoothing circuit 5 and the inverter circuit 7. The restriking circuit 6 applies a high voltage across the output terminals a1 and b1 of the welding power supply A1 at the time of switching the output polarity of the welding power supply A1. Such a high voltage is applied to achieve reliable restriking at the time of polarity switching and hereinafter referred to as "restriking voltage". Arc extinction is likely to occur when the output polarity switches from the forward polarity to the reversed polarity. In the present embodiment, therefore, the restriking circuit 6 applies the restriking voltage only when the output polarity switches from the forward polarity to the reversed polarity and does not apply the restriking voltage when the output polarity switches from the reversed polarity to the forward polarity. The restriking circuit 6 includes a diode 61, a restriking capacitor 62, a charging circuit 63 and a discharging circuit 64.

The diode 61 and the restriking capacitor 62 are connected in series to each other and in parallel to the input side of the inverter circuit 7. The diode 61 has an anode terminal connected to the input terminal on the positive electrode side of the inverter circuit 7 and a cathode terminal connected to one of the terminals of the restriking capacitor 62. One of the terminals of the restriking capacitor 62 is connected to the cathode terminal of the diode 61, and the other terminal of the restriking capacitor 62 is connected to the input terminal on the negative electrode side of the inverter circuit 7. The restriking capacitor 62 has a predetermined capacitance and is charged with a restriking voltage that will be added to the output from the welding power supply A1. The restriking capacitor 62 is charged by the charging circuit 63 and discharged by the discharging circuit 64. Cooperating with the diode 61, the restriking capacitor 62 absorbs the surge voltage at the time of switching the inverter circuit 7. That is, the restriking capacitor 62 also functions as a snubber circuit for absorbing surge voltage.

The charging circuit 63 is a circuit for charging the restriking capacitor 62 for generating the restriking voltage and connected in parallel to the restriking capacitor 62. FIG. 2A shows an example of the charging circuit 63. As shown in FIG. 2A, the charging circuit 63 according to the present embodiment includes a rectifying/smoothing circuit 63c and a boost chopper 63d. The rectifying/smoothing circuit 63c includes a rectifying circuit that performs full-wave rectification of AC voltage and a smoothing capacitor for smoothing the rectified voltage. The rectifying/smoothing circuit 63c converts the high-frequency voltage inputted from the auxiliary winding 3c of the transformer 3 into DC voltage. The circuit configuration of the rectifying/smoothing circuit 63c may be varied.

The boost chopper 63d raises the DC voltage inputted from the rectifying/smoothing circuit 63c and outputs it to the restriking capacitor 62. The boost chopper 63d includes a coil and a diode that are connected in series between the input terminal and the output terminal. (One of the terminals of the coil is connected to the anode terminal of the diode: the coil arranged on the input terminal side whereas the diode is arranged on the output terminal side.) A switching element 63b is connected in parallel to the connection point of the coil and the diode. A capacitor is connected in parallel to the cathode terminal of the diode. The circuit configuration of the boost chopper 63d may be varied. Although the switching element 63b is a MOSFET in the present embodiment, the switching element 63b may be an IGBT, a bipolar transistor or the like.

The boost chopper 63d is provided with a drive circuit 63a for driving the switching element 63b. The drive circuit 63a outputs a pulse signal for driving the switching element 63b based on a charging circuit driving signal inputted from a charge controller 86. While the charging circuit driving signal is OFF (e.g. low-level signal), the drive circuit 63a does not output a pulse signal. During this period, the switching element 63b is maintained in the off state. Thus, the DC voltage inputted from the rectifying/smoothing circuit 63c is applied as it is to the restriking capacitor 62 to charge the restriking capacitor 62. On the other hand, while the charging circuit driving signal is ON (e.g. high-level signal), the drive circuit 63a outputs a predetermined pulse signal to the switching element 63b. This actuates the boost chopper 63d so that the DC voltage inputted from the rectifying/smoothing circuit 63c is raised and applied to the restriking capacitor 62 to charge the restriking capacitor 62. That is, based on the charging circuit driving signal, the charging circuit 63 performs switching between the state for applying the DC voltage from the rectifying/smoothing circuit 63c as it is to the restriking capacitor 62 and the state for applying the DC voltage after the DC voltage is raised. Note that the drive circuit 63a may be dispensed with, and the charge controller 86 may directly input a pulse signal as the charging circuit driving signal into the switching element 63b. The configuration of the charging circuit 63 may be varied. For example, the charging circuit 63 may be provided with an isolated forward converter instead of the boost chopper 63d.

The discharging circuit 64 discharges the restriking voltage charged in the restriking capacitor 62. The discharging circuit 64 is connected between the connection point of the diode 61 and the restriking capacitor 62 and the connection line 4 that connects the center tap of the secondary winding 3b and the output terminal b1. FIG. 2B shows an example of the discharging circuit 64. As shown in the figure, the discharging circuit 64 includes a switching element 64a and a current limiting resistor 64b. In the present embodiment, the switching element 64a is an IGBT. The switching element may be a bipolar transistor, a MOSFET or the like. The switching element 64a and the current limiting resistor 64b are connected in series to each other and connected in series to the restriking capacitor 62. The collector terminal of the switching element 64a is connected to one of the terminals of the current limiting resistor 64b, and the emitter terminal of the switching element 64a is connected to the connection line 4 via the connection line 64c. Note that the current limiting resistor 64b may be connected to the emitter side of the switching element 64a. The discharge controller 85, which will be described later, inputs a discharging circuit driving signal to the gate terminal of the switching element 64a. While the discharging circuit driving signal is ON (e.g. high-level signal), the switching element 64a is in the on state. In this state, the restriking voltage charged in the restriking capacitor 62 is discharged via the current limiting resistor 64b. While the discharging circuit driving signal is OFF (e.g. low-level signal), the switching element 64a is in the off state. In this state, discharge of the restriking voltage is interrupted. In this way, based on the discharging circuit driving signal, the discharging circuit 64 is switched between the state for discharging the restriking capacitor 62 and the state for not discharging the restriking capacitor 62. The configuration of the discharging circuit 64 may be varied.

The current sensor 91 detects the output current Iout from the welding power supply A1. In the present embodiment, the current sensor 91 is arranged on the connection line 71 that connects the output terminal of the inverter circuit 7 and the output terminal a1. In the present embodiment, current may flow from the inverter circuit 7 toward the output terminal a1 (which is referred to as "positive" state), or may flow from the output terminal a1 toward the inverter circuit 7 (which is referred to as "negative" state). The current sensor 91 detects the instantaneous value of the output current and inputs it to the controlling circuit 8. The current sensor 91 may have any configuration as long as it detects the output current Iout from the connection line 71. Further, the position of the current sensor 91 is not limited to the illustrated one. For example, the current sensor 91 may be placed on the connection line 4.

The controlling circuit 8 controls the welding power supply A1 and its function may be implemented by a microcomputer, for example. To the controlling circuit 8, the instantaneous value of the output current is inputted from the current sensor 91. The controlling circuit 8 outputs a driving signal to each of the inverter circuit 2, the inverter circuit 7, the charging circuit 63 and the discharging circuit 64. The controlling circuit 8 includes a current controller 81, a target current setter 82, a polarity switching controller 83, a discharge controller 85 and a charge controller 86.

The current controller 81 controls the inverter circuit 2 for achieving feedback control with respect to the output current Iout from the welding power supply A1. The current controller 81 converts the instantaneous value signal of the output current (inputted from the current sensor 91) into an absolute value signal by using an absolute value circuit. Based on the deviation between the absolute value signal and the output current set value inputted from the target current setter 82, the current controller 81 generates an output control driving signal for controlling the switching elements of the inverter circuit 2 by PWM control, and outputs the output control driving signal to the inverter circuit 2. As will be described later, while a stop signal inputted from the polarity switching controller 83 is ON (e.g. high-level signal), the current controller 81 stops outputting the output control driving signal. Accordingly, the inverter circuit 2 stops switching the switching elements to stop high-frequency power output.

The polarity switching controller 83 controls the inverter circuit 7 in switching the output polarity of the welding power supply A1. The polarity switching controller 83 generates switching driving signals that are pulse signals for controlling the switching elements Q1 and Q2 such that the output polarity is switched, and outputs the switching driving signals to the inverter circuit 7. Specifically, the polarity switching controller 83 generates a switching driving signal S1 that is inputted to the switching element Q1 to control the switching of the switching element Q1, and a switching driving signal S2 that is inputted to the switching element Q2 to control the switching of the switching element Q2. When the switching driving signal S1 is ON (high level signal), the switching element Q1 is ON, with the emitter terminal and the collector terminal electrically connected to each other. When the switching driving signal S1 is OFF (low level signal), the switching element Q1 is OFF, with the emitter terminal and the collector terminal disconnected. When the switching driving signal S2 is ON (high level signal), the switching element Q2 is ON, with the emitter terminal and the collector terminal electrically connected to each other. When the switching driving signal S2 is OFF (low level signal), the switching element Q2 is OFF, with the emitter terminal and the collector terminal disconnected. Thus, when the switching driving signal S1 is ON and the switching driving signal S2 is OFF, the potential of the output terminal a1 (workpiece W) is higher than the potential of the output terminal b1 (welding torch B) (i.e., forward polarity). When the switching driving signal S1 is OFF and the switching driving signal S2 is ON, the potential of the output terminal a1 (workpiece W) is lower than the potential of the output terminal b1 (welding torch B) (i.e., reversed polarity). In the present embodiment, in switching the output polarity, the polarity switching controller 83 sets both of the switching elements Q1 and Q2 to ON for a certain period of time by setting both switching driving signals S1 and S2 to ON such that a short circuit is caused (a short-circuit period). The switching driving signals S1 and S2 are outputted to the discharge controller 85 and the charge controller 86 as well.

The polarity switching controller 83 also generates a stop signal for making the current controller 81 stop outputting the output control driving signal, and outputs the stop signal to the current controller 81. In the present embodiment, in switching the output polarity, the polarity switching controller 83 sets the stop signal to ON before the short-circuit period to make the current controller 81 stop outputting the output control driving signal.

Generation of the switching driving signals S1, S2 and the stop signal by the polarity switching controller 83 is described below in more detail.

In switching the output polarity, the polarity switching controller 83 first stops the output of the inverter circuit 2. Specifically, the polarity switching controller 83 sets the stop signal to ON to make the current controller 81 stop outputting the output control driving signal, to thereby stop the output of the inverter circuit 2. Since the output of the inverter circuit 2 is stopped, the absolute value of an instantaneous value of the output current gradually decreases. When the absolute value of the instantaneous value of the output current decreases to or below a "short-circuit switching current value", the polarity switching controller 83 sets both switching elements Q1 and Q2 to ON to cause the short-circuit state. When the absolute value of the instantaneous value of the output current further decreases to or below a "polarity switching current value", the switching element that was ON before the short-circuit state is switched to OFF. The "polarity switching current value" is a threshold for the output current determined in advance such that when the output current is not higher than this threshold, switching the switching element Q1 or Q2 to OFF will not generate a surge voltage exceeding an acceptable range. The "short-circuit switching current value" is a threshold for the output current that is determined to decrease the output current Iout to a certain degree in advance so that an unacceptably large surge voltage can be avoided even when the output current set value is considerably large.

Specifically, the short-circuit switching current value is determined such that when the output current is not higher than this value, the surge voltage lies within the acceptable range. It is now assumed that the polarity switching current value is 200 A. In this case, when the output current set value is 300 A, the surge voltage in switching off a switching element lies within the acceptable range even if stopping the output of the inverter circuit 2 and switching to the short-circuit state are performed simultaneously. However, when the output current set value is 500 A, the surge voltage in switching off a switching element exceeds the acceptable range if stopping the output of the inverter circuit 2 and switching to the short-circuit state are performed simultaneously. The threshold of the output current below which the surge voltage will lie within the acceptable range even if stopping the output of the inverter circuit 2 and switching to the short-circuit state are performed simultaneously, which may be 350 A in this example, is set as the short-circuit switching current value. The short-circuit switching current value may be determined appropriately based on experiments or simulations.

FIG. 3 is a functional block diagram showing an example of the internal configuration of the polarity switching controller 83. The polarity switching controller 83 includes comparing circuits 831 and 832, a signal generating circuit 833, a timer circuit 834 and a stopping circuit 835.

The comparing circuit 831 compares the instantaneous value of the output current (hereinafter referred to as "output current instantaneous value") with the polarity switching current value $I_1$. Since the output current Iout is an alternating current that periodically reverses the direction, the output current instantaneous value, which is detected by the current sensor 91, can be a negative value. To perform switching from the short-circuit state to the reversed polarity, the comparing circuit 831 compares the output current instantaneous value with the polarity switching current value $I_1$. To perform switching from the short-circuit state to the forward polarity, the comparing circuit 831 compares the output current instantaneous value with '$-I_1$' (i.e., negative of the polarity switching current value $I_1$). The comparison results are outputted to the signal generating circuit 833, the timer circuit 834 and the stopping circuit 835.

The comparing circuit 832 compares the output current instantaneous value with the short-circuit switching current value $I_2$. To perform switching from the forward polarity to the short-circuit state, the comparing circuit 832 compares the output current instantaneous value with the short-circuit switching current value $I_2$. To perform switching from the reversed polarity to the short-circuit state, the comparing circuit 832 compares the output current instantaneous value with '$-I_2$' (i.e., negative of the short-circuit switching current value $I_2$). The comparison results are outputted to the signal generating circuit 833.

The signal generating circuit 833 generates switching driving signals S1 and S2 based on the comparison results inputted from the comparing circuits 831 and 832. Specifically, the signal generating circuit 833 generates a pulse signal that becomes ON when the output current instantaneous value increases to or above $-I_2$ and becomes OFF when the output current instantaneous value decreases to or below the polarity switching current value $I_1$, and outputs this pulse signal as the switching driving signal S1. Also, the signal generating circuit 833 generates a pulse signal that becomes ON when the output current instantaneous value decreases to or below the short-circuit switching current value $I_2$ and becomes OFF when the output current instantaneous value increases to or above $-I_1$, and outputs this pulse signal as the switching driving signal S2.

The timer circuit 834 counts a predetermined time period T. The timer circuit 834 starts counting the time when the output current instantaneous value decreases to or below the polarity switching current value $I_1$ and outputs a timing signal to the stopping circuit 835 when the predetermined time T has elapsed. The timer circuit 834 also starts counting the time when the output current instantaneous value increases to or above $-I_1$ and outputs a timing signal to the stopping circuit 835 when the predetermined time T has elapsed.

The stopping circuit 835 generates a stop signal based on the comparison results inputted from the comparing circuit 831 and the timing signal inputted from the timer circuit 834. Specifically, the stopping circuit 835 generates a pulse signal that becomes ON when a timing signal is inputted from the timer circuit 834 and that becomes OFF when the output current instantaneous value decreases to or below the polarity switching current value $I_1$ or increases to or above $-I_1$.

The internal configuration of the polarity switching controller 83 is not limited to that shown in FIG. 3.

FIG. 4 is a time chart illustrating variation with time of signals and currents for explaining the polarity switching process in the welding power supply A1. In the figure, (a) shows the stop signal outputted from the stopping circuit 835, (b) shows the switching driving signal S1 generated by the signal generating circuit 833, (c) shows the switching driving signal S2 generated by the signal generating circuit 833, (d) shows the output current instantaneous value (the instantaneous value of the output current Iout) detected by the current sensor 91, and (e) shows the current Ien and the current Iep flowing through the switching element Q1 and the switching element Q2, respectively. Note that when the current Iep (the current Ien) has a negative value, the current Iep (the current Ien) does not actually flow through the switching element Q2 (Q1) but flows through a diode connected in reverse parallel to the switching element Q2 (Q1). (The current flows in the opposite direction of the arrow shown in FIG. 1).

Until the time t1, the output polarity is the forward polarity, and the output current Iout is controlled to the set value (see (d) in FIG. 4) At time t1, the stop signal is switched from OFF to ON (see (a) in FIG. 4). In response to this, the inverter circuit 2 stops the high-frequency power output. As a result, the output current instantaneous value decreases to (or below) the short-circuit switching current value $I_2$ at time t2 (see (d) in FIG. 4). In response to this, the switching driving signal S2 becomes ON (see (c) in FIG. 4). Note that the driving signal S1 is ON before time t1 (see (b) in FIG. 4). That is, at time t2, both switching driving signals S1 and S2 are ON so that the short-circuit state is achieved. Note that, during the period from time t1 to time t2, the short-circuit state is not achieved although the output of the inverter circuit 2 is stopped. (The switching element Q1 is ON, whereas the switching element Q2 is OFF.) During this period, the current Iep through the switching element Q2 is zero because the switching element Q2 is OFF, and the current Ien flowing through the switching element Q1 corresponds to the output current Iout (see (e) in FIG. 4).

Because of the short-circuit state achieved at t2, the output current instantaneous value further decreases to (or below) the polarity switching current value $I_1$ at time t3 (see (d) in FIG. 4). In response to this, the switching driving signal S1 becomes OFF (see (b) in FIG. 4), the stop signal becomes OFF (see (c) in FIG. 4), and the timer circuit 834 starts counting the time. The time period from time t2 to time t3 is the short-circuit period. During the short-circuit period, the current Iep flowing through the switching element Q2 gradually increases from zero. The current Ien flowing through the switching element Q1, which is equivalent to the sum of the output current Iout and the current Iep, decreases gradually (see (e) in FIG. 4). Since the current Iep does not increase during the period from time t1 to time t2 and increases only during the period from time t2 to time t3 (short-circuit period), the current Iep at time t3 is low as compared with the case where the current Iep would increase throughout the period from time t1 to time t3. In this manner, the output current instantaneous value decreases to the short-circuit switching current value $I_2$ during the period from time t1 to time t2, in which the switching element Q2 is OFF and the current Iep does not increase.

At time t3, a surge voltage is applied to the switching element Q1 because of the switching driving signal S1 becoming OFF as described above. However, since the current Ien flowing through the switching element Q1 does not deviate largely from the polarity switching current value $I_1$, the surge voltage advantageously lies within the acceptable range.

At time t3, the output polarity is switched to the reversed polarity because of the switching driving signal S1 becoming OFF. Thereafter, the output current decreases rapidly to zero and then changes its flow direction and increases to the negative value whose absolute value is equal to that of the output current set value (see (d) in FIG. 4). When the output current instantaneous value becomes zero in this process, a restriking voltage is applied by the restriking circuit 6, which achieves reliable restriking and prevents arc extinction.

During the period from time t3 to time t4, the output polarity is the reversed polarity, and the output current Iout is controlled to the opposite (negative value) of the output current set value (see (d) in FIG. 4). At time t4, the stop signal is switched from OFF to ON (see (a) in FIG. 4). In response to this, the inverter circuit 2 stops the high-frequency power output. As a result, the output current instantaneous value increases to or above $-I_2$ at time t5 (see (d) in FIG. 4). In response to this, the switching driving signal S1 becomes ON (see (b) in FIG. 4). Note that switching driving signal S2 is ON before time t5 (see (c) in FIG. 4). That is, at time t5, both switching driving signals S1 and S2 are ON so that the short-circuit state is achieved. Note that, during the period from time t4 to time t5, the short-circuit state is not achieved although the output of the inverter circuit 2 is stopped. (The switching element Q2 is ON, whereas the switching element Q1 is OFF.) During this period, the current Ien through the switching element Q1 is zero because the switching element Q1 is OFF, and the current Iep flowing through the switching element Q2 equals to |Iout| (see (e) in FIG. 4), where |*| denoted the absolute value.

Because of the short-circuit state achieved at t5, the output current instantaneous value further increases to or above $-I_1$ at time t6 (see (d) in FIG. 4). In response to this, the switching driving signal S2 becomes OFF (see (c) in FIG. 4), the stop signal becomes OFF (see (a) in FIG. 4), and the timer circuit 834 starts counting the time. The time period from time t5 to time t6 is the short-circuit period. During the short-circuit period, the current Ien flowing through the switching element Q1 gradually increases from zero. The current Iep flowing through the switching element Q2 is equivalent to the current Ien minus the output current Iout (i.e., the sum of the opposite of the output current Iout and the current Ien) and decreases gradually (see (e) in FIG. 4). Since the current Ien does not increase during the period from time t4 to time t5 and increases only during the period from time t5 to time t6 (short-circuit period), the current Ien at time t6 is low as compared with the case where the current Ien increases throughout the period from time t4 to time t6. In this manner, the output current instantaneous value increases to $-I_2$ during the period from time t4 to time t5, in which the switching element Q1 is OFF and the current Ien does not increase.

At time t6, a surge voltage is applied to the switching element Q2 because of the switching driving signal S2 becoming OFF as described above. However, since the current Iep flowing through the switching element Q2 does not deviate largely from the polarity switching current value $I_1$, the surge voltage advantageously lies within the acceptable range.

At time t6, the output polarity is switched to the forward polarity because of the switching driving signal S2 becoming OFF. Thus, the output current increases rapidly and changes its direction to reach the output current set value (see (d) in FIG. 4).

Referring again to FIG. 1, the discharge controller 85 controls the discharging circuit 64. Based on the switching driving signal inputted from the polarity switching controller 83, the discharge controller 85 generates a discharging circuit driving signal for controlling the discharging circuit 64 and outputs it to the discharging circuit 64. While the discharging circuit driving signal is ON, the discharging circuit 64 discharges the restriking voltage charged in the restriking capacitor 62. The discharge controller 85 generates the discharging circuit driving signal in such a manner that the discharging circuit driving signal is ON when the output current Iout from the welding power supply A1 changes from positive to negative. Specifically, the discharge controller 85 generates a pulse signal that switches to ON when the switching driving signal S1 is switched from ON to OFF and that switches to OFF after the lapse of a predetermined time period since the pulse signal was switched to ON. The discharge controller 85 outputs this pulse signal as the discharging circuit driving signal. The time period is set to cover the timing at which the output current Iout changes from positive to negative. The manner in which the discharge controller 85 generates the discharging circuit driving signal is not limited to the above. It is only required that the restriking voltage is applied when the output current Iout changes from positive to negative, so that the discharging circuit driving signal is only required to become ON before the output current Iout changes from positive to negative and become OFF after the output current Iout is changed from positive to negative.

The charge controller 86 controls the charging circuit 63. The charge controller 86 generates a charging circuit driving signal for controlling the charging circuit 63 based on the switching driving signal inputted from the polarity switching controller 83 and the instantaneous value of the voltage between the terminals of the restriking capacitor 62 inputted from a voltage sensor, and outputs the charging circuit driving signal to the charging circuit 63. While the charging circuit driving signal is ON, the charging circuit 63 charges the restriking capacitor 62. The charging circuit 63 needs to charge the restriking capacitor 62 with the restriking voltage after the completion of discharge by the discharging circuit 64 and before the timing of next discharge. When the restriking capacitor 62 is charged to the target voltage, further charging is not necessary. Thus, the charge controller 86 generates the charging circuit driving signal so that the charging circuit driving signal is ON from when the discharge by the discharging circuit 64 is completed till when the restriking capacitor 62 is charged to the target voltage. Specifically, the charge controller 86 generates a pulse signal that switches to ON after the lapse of a predetermined time period since the switching driving signal S1 was switched from ON to OFF and that switches to OFF when the voltage between the terminals of the restriking capacitor 62 reaches the target voltage. The charge controller 86 outputs this pulse signal as the charging circuit driving signal. The manner in which the charge controller 86 generates the charging circuit driving signal is not limited to the above. The charging circuit driving signal may be switched to ON at any time after the completion of discharge by the discharging circuit 64 and before the timing of next discharge as long as it allows the restriking capacitor 62 to be properly charged to the target voltage.

The functions of the controlling circuit 8 may be implemented by a microcomputer (which may operate on a program made up of modularized sections) or a digital or analog circuit including logic circuits.

The operation and advantages of the welding power supply according to the present embodiment are described below.

According to the present embodiment, in switching the output polarity, the polarity switching controller 83 first stops the output of the inverter circuit 2. Since the welding power supply is not in the short-circuit state at this time, stopping the output of the inverter circuit 2 causes the output current to decrease. In this state, no current is flowing through the switching element that is in the off state. When the absolute value of the output current instantaneous value decreases to or below the short-circuit switching current value, the polarity switching controller 83 sets both switching elements Q1 and Q2 to the on state to cause a short circuit. During the short-circuit state, current flows also through the switching element that was OFF before the polarity switching. The amount of current increase due to such current flow is small, however, as compared with the case where the output of the inverter circuit 2 is stopped at the same time as causing a short circuit, whereby the amount of current flowing through the other switching element that was ON before the polarity switching is also small. Thus, even when the output current set value is considerably large, subsequently switching one of the switching elements to OFF causes only a small amount of current to flow through that switching element. Accordingly, the surge voltage is prevented from exceeding the acceptable range.

Also, in switching the output polarity, the polarity switching controller 83 stops the output of the inverter circuit 2 by setting the stop signal to ON to cause the current controller 81 to stop outputting the output control driving signal. Thus, the output current Iout decreases quickly, so that the time taken for the output polarity switching process is reduced. Also, the polarity switching controller 83 sets the short-circuit period to switch the output polarity. This causes the output current Iout to decrease quickly, so that the time taken for the output polarity switching process is further reduced.

Also, in switching the output polarity, the polarity switching controller 83 first stops the output of the inverter circuit 2 and then performs switching to the short-circuit state when the absolute value of the output current instantaneous value decreases to or below the short-circuit switching current value. As described before, the short-circuit switching current value is a threshold below which the surge voltage generated in switching a switching element to OFF will lie within the acceptable range even if stopping the output of the inverter circuit 2 and switching to the short-circuit state are performed simultaneously. Thus, by the polarity switching controller 83 not switching to the short-circuit state until the absolute value of the output current instantaneous value decreases to or below the short-circuit switching current value, the surge voltage reliably lies within the acceptable range. Also, by the polarity switching controller 83 switching to the short-circuit state when the absolute value of the output current instantaneous value decreases to or below the short-circuit switching current value, the time taken for the output polarity switching process is shortened.

In the present embodiment, in switching the output polarity, the output of the inverter circuit 2 is stopped by making the current controller 81 stop outputting the output control driving signal. However, the present disclosure is not limited to this, and the output of the inverter circuit 2 may not be stopped but reduced. Specifically, the polarity switching controller 83 may make the target current setter 82 change the output current set value to zero, and the current controller 81 may control the output current Iout to zero, so that the output from the inverter circuit 2 is reduced. The output current set value may not be set to zero but set to the polarity switching current value $I_1$ or the short-circuit switching current value $I_2$. To reduce the output current Iout quickly, it is desirable to stop the output of the inverter circuit 2.

In the present embodiment, to switch from the short-circuit state to the forward polarity, the polarity switching controller 83 compares the output current instantaneous value with $-I_1$ ($I_1$ is the polarity switching current value). However, the present disclosure is not limited to this, and values other than $-I_1$ may be used as the polarity switching current value. That is, the polarity switching current value for switching from the short-circuit state to the forward polarity and the polarity switching current value for switching from the short-circuit state to the reversed polarity may have different absolute values. For example, the absolute value of the polarity switching current value for switching to the forward polarity may be set larger than that for switching to the reversed polarity. In this case, a larger surge voltage is generated in switching to the forward polarity, which may promote the charging of the restriking capacitor 62. Similarly, the short-circuit switching current value for switching from the reversed polarity to the short-circuit state and that for switching from the forward polarity to the short-circuit state may have different absolute values.

Although the present embodiment utilizes a DC power supply circuit including the rectifying/smoothing circuit 1, the inverter circuit 2, the transformer 3 and the rectifying/smoothing circuit 5, the present disclosure is not limited to this. The configuration of the DC power supply circuit for supplying DC power to the inverter circuit 7 may be varied. For example, the AC voltage from the commercial power supply D may be raised by a transformer, or a DC voltage may be raised by a DC/DC converter or a boost chopper.

Figure 5:
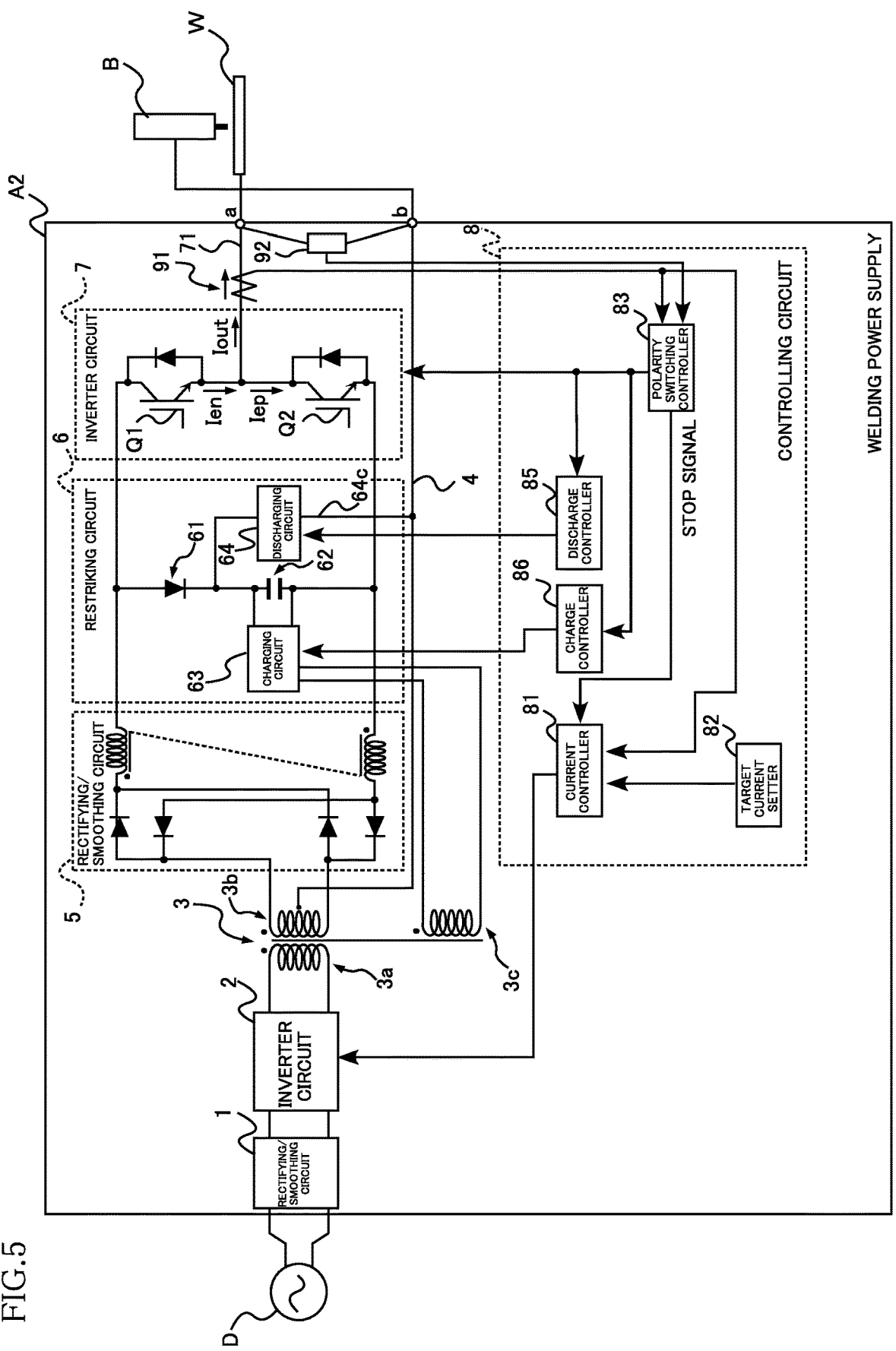
FIG. 5 is a block diagram of a welding power supply according to a second embodiment.
Figure 6:
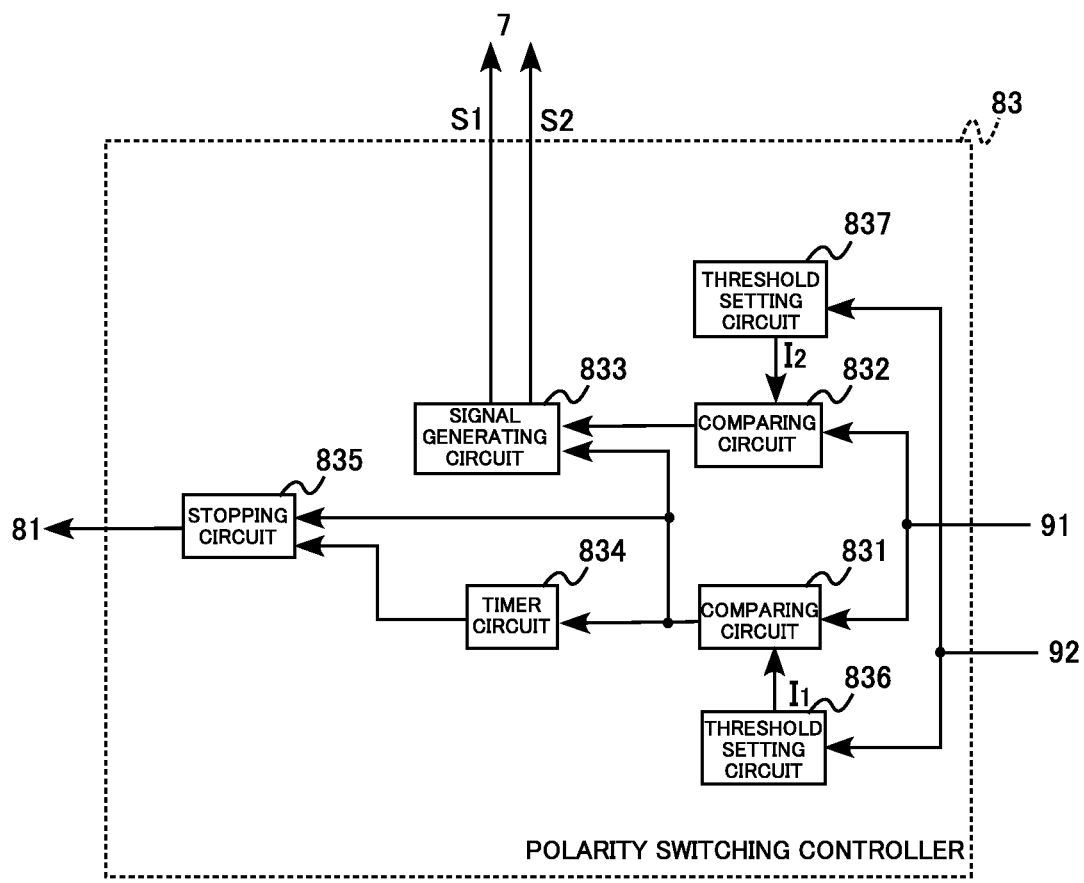
FIG. 6 is a functional block diagram showing an example of the internal configuration of the polarity switching controller according to the second embodiment.
Figure 7:
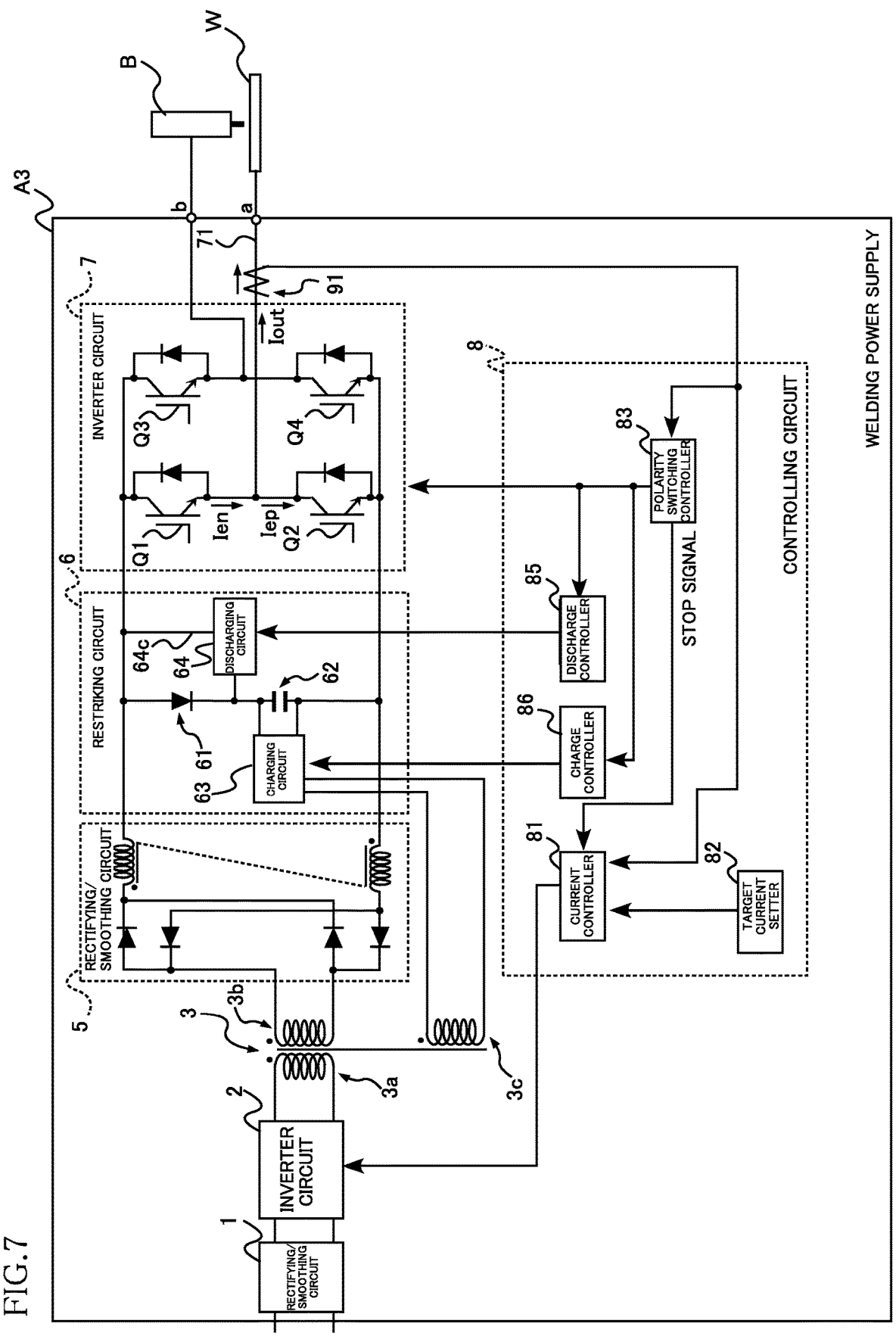
FIG. 7 is a block diagram of a welding power supply according to a third embodiment.

FIGS. 5-7 show other embodiments of the present disclosure. In these figures, the elements that are identical or similar to those of the foregoing embodiment are denoted by the same reference signs as those used for the foregoing embodiment.

FIGS. 5 and 6 are views for explaining a welding power supply A2 according to a second embodiment of the present disclosure. FIG. 5 is a block diagram of a welding power supply A2 and shows the overall configuration of the welding system. FIG. 6 is a functional block diagram showing an example of the internal configuration of the polarity switching controller 83. The welding power supply A2 differs from the welding power supply A1 (see FIGS. 1 and 3) of the first embodiment in that the polarity switching current value $I_1$ and the short-circuit switching current value $I_2$ are changed in accordance with the output voltage Vout.

As shown in FIG. 5, the welding power supply A2 includes a voltage sensor 92. The voltage sensor 92 is provided for detecting the output voltage Vout of the welding power supply A2 and detects the voltage across the output terminal a1 and the output terminal b1. In the present embodiment, the condition where the potential of the output terminal a1 is higher than that of the output terminal b1 is defined as positive, whereas the condition where the potential of the output terminal a1 is lower than that of the output terminal b1 is defined as negative. The voltage sensor 92 detects the instantaneous value of the output voltage Vout and inputs it into the controlling circuit 8. The voltage sensor 92 may have any configuration as long as it detects the output voltage Vout. Though description is omitted, the welding power supply A1 according to the first embodiment also includes the voltage sensor 92.

As shown in FIG. 6, the polarity switching controller 83 further includes threshold setting circuits 836 and 837. The threshold setting circuit 836 sets the polarity switching current value $I_1$ in accordance with the output voltage Vout. Specifically, the instantaneous values of the output voltage Vout (hereinafter referred to as "output voltage instantaneous values") detected by the voltage sensor 92 are inputted to the threshold setting circuit 836, which calculates the average of the output voltage Vout (hereinafter referred to as the "output voltage average value"). The output voltage average value is obtained by calculating the integral of the absolute value of the output voltage instantaneous values over a predetermined period of time and dividing the result of the integration by the period of time. The predetermined period of time may be the time period corresponding to one cycle of the output voltage Vout but is not limited to this. The threshold setting circuit 836 may calculate an effective value instead of the above-noted average value. The threshold setting circuit 836 compares the output voltage average value obtained in this way with a threshold $V_0$. When the output voltage average value is equal to or lower than the threshold $V_0$, the threshold setting circuit 836 sets $I_{1H}$ as the polarity switching current value $I_1$ and outputs it to the comparing circuit 831. When the output voltage average value is larger than the threshold $V_0$, the threshold setting circuit 836 sets $I_{1L}$ smaller than $I_{1H}$ as the polarity switching current value $I_1$ and outputs it to the comparing circuit 831.

When the switching element that was ON before the short-circuit state is switched to OFF to change the output polarity, a current flows through the switching element, and this current becomes larger as the impedance of the external load of the welding power supply A2 is larger. This is because, a larger impedance of the external load causes a larger current to be regenerated during the short-circuit state (the current flowing through the switching element that was OFF before the short-circuit state). Accordingly, when the impedance of the external load is large, a large current maybe flowing through the switching element even when the absolute value of the output current instantaneous value decreases to the polarity switching current value $I_1$. In such a case, a surge voltage exceeding the acceptable range may be generated when the switching element is switched to OFF. According to the present embodiment, such a situation is avoided by changing the polarity switching current value $I_1$ to a smaller value when the impedance of the external load is large. Since a large impedance of the external load leads to a large output voltage Vout, the threshold setting circuit 836 according to the present embodiment compares the output voltage average value with the threshold $V_0$. In accordance with the comparison results, the threshold setting circuit 836 switches the polarity switching current value $I_1$ between $I_{1H}$ and $I_{1L}$ for output to the comparing circuit 831.

The threshold setting circuit 837 operates similarly to the threshold setting circuit 836 and sets the short-circuit switching current value $I_2$ in accordance with the output voltage average value. Specifically, the threshold setting circuit 837 compares the output voltage average value with a threshold $V_0$. When the output voltage average value is equal to or lower than the threshold $V_0$, the threshold setting circuit 837 sets $I_{2H}$ as the short-circuit switching current value $I_2$ and outputs it to the comparing circuit 832. When the output voltage average value is larger than the threshold $V_0$, the threshold setting circuit 837 sets $I_{2L}$ smaller than $I_{2H}$ as the short-circuit switching current value $I_2$ and outputs it to the comparing circuit 832.

In the present embodiment again, the effects similar to those of the first embodiment are achieved. Further, according to the present embodiment, the threshold setting circuit 836 sets $I_{1H}$ as the polarity switching current value $I_1$ when the output voltage average value is equal to or lower than the threshold $V_0$ and sets $I_{1L}$ smaller than $I_{1H}$ as the polarity switching current value $I_1$ when the output voltage average value is larger than the threshold $V_0$. That is, the polarity switching controller 83 changes the polarity switching current value $I_1$ to a smaller value ($I_{1L}$) when the impedance of the external load is large. Thus, even when the impedance of the external load is large and a large current is regenerated by the short-circuit state, only a small amount of current flows through a switching element when the switching element is switched to OFF, because the polarity switching controller 83 switches the switching element to OFF after the absolute value of the output current instantaneous value decreases to or below $I_{1L}$. Thus, the surge voltage is prevented from exceeding the acceptable range. Also, similarly to the threshold setting circuit 836, the threshold setting circuit 837 sets the short-circuit switching current value $I_2$ in accordance with the output voltage average value. Thus, the polarity switching controller 83 can set the short-circuit switching current value $I_2$ in relation to the polarity switching current value $I_1$. Since the short-circuit switching current value $I_2$ is changed in relation to the polarity switching current value $I_1$, the surge voltage reliably lies within the acceptable range, while the time taken for switching the output polarity can be made as short as possible.

Although the threshold setting circuit 836 switches the polarity switching current value $I_1$ between two values in the present embodiment, the present disclosure is not limited to this. That is, the threshold setting circuit 836 may switch the polarity switching current value $I_1$ among three or more values or may change the polarity switching current value $I_1$ linearly in accordance with the output voltage average value. Similarly, although the threshold setting circuit 837 switches the short-circuit switching current value $I_2$ between two values in the present embodiment, the present disclosure is not limited to this. That is, the threshold setting circuit 837 may switch the short-circuit switching current value $I_2$ among three or more values or may change the short-circuit switching current value $I_2$ linearly in accordance with the output voltage average value. Note that threshold setting circuit 836 and the threshold setting circuit 837 may employ different switching methods. That is, the polarity switching current value $I_1$ and the short-circuit switching current value $I_2$ may not be changed in relation to each other. Further, the short-circuit switching current value $I_2$ may be fixed while the polarity switching current value $I_1$ maybe made changeable and vice versa.

FIG. 7 is a block diagram of a welding power supply A3 according to a third embodiment of the present disclosure and shows the overall configuration of the welding system. Note that illustration of the commercial power supply D is omitted in FIG. 7. The welding power supply A3 differs from the welding power supply A1 according to the first embodiment (see FIG. 1) in that the inverter circuit 7 is a full-bridge inverter.

The inverter circuit 7 according to the present embodiment is a single-phase full-bridge type PWM control inverter and has four switching elements Q1-Q4. The switching element Q1 and the switching element Q2 are connected in series to each other, with the emitter terminal of the switching element Q1 and the collector terminal of the switching element Q2 connected to each other. The collector terminal of the switching element Q1 is connected to the input terminal on the positive electrode side of the inverter circuit 7. The emitter terminal of the switching element Q2 is connected to the input terminal on the negative electrode side of the inverter circuit 7. Similarly, the switching element Q3 and the switching element Q4 are connected in series to each other, with the emitter terminal of the switching element Q3 and the collector terminal of the switching element Q4 connected to each other. The collector terminal of the switching element Q3 is connected to the input terminal on the positive electrode side of the inverter circuit 7. The emitter terminal of the switching element Q4 is connected to the input terminal on the negative electrode side of the inverter circuit 7. The connection point of the switching element Q1 and the switching element Q2 is connected to the output terminal a1 via the connection line 71. The connection point of the switching element Q3 and the switching element Q4 is connected to the output terminal b1 via a connection line. A diode is connected in reverse parallel to each of the switching elements Q1-Q4.

A switching driving signal S1 outputted from the controlling circuit 8 is inputted into the gate terminals of the switching element Q1 and switching element Q4. A switching driving signal S2 outputted from the controlling circuit 8 is inputted into the gate terminals of the switching element Q2 and switching element Q3. When the switching driving signal S1 is ON and the switching driving signal S2 is OFF, the switching elements Q1 and Q4 are in the on state whereas the switching elements Q2 and Q3 are in the off state, so that the inverter circuit 7 provides the forward polarity (where the potential of the output terminal a1 connected to the workpiece W is higher than the potential of the output terminal b1 connected to the electrode of the welding torch B). When the switching driving signal S1 is OFF and the switching driving signal S2 is ON, the switching elements Q1 and Q4 are in the off state whereas the switching elements Q2 and Q3 are in the on state, so that the inverter circuit 7 provides the reversed polarity (where the potential of the output terminal a1 connected to the workpiece W is lower than the potential of the output terminal b1 connected to the electrode of the welding torch B). When both switching driving signals S1 and S2 are ON, all of the switching elements Q1-Q4 are in the on state, so that the short-circuit state is established.

In the restriking circuit 6 of the present embodiment, the connection line 64c is connected to the input terminal on the positive electrode side of the inverter circuit 7. In the transformer 3 of the present embodiment, the secondary winding 3b is not provided with a center tap, and the connection point of the switching element Q3 and the switching element Q4 is connected to the output terminal b1 via a connection line.

In the third embodiment again, the effects similar to those of the first embodiment are achieved. According to the present embodiment, since the connection line 64c is connected to the input terminal on the positive electrode side of the inverter circuit 7, the restriking circuit 6 can apply the restriking voltage not only when the output polarity switches from the forward polarity to the reversed polarity but also when the output polarity switches from the reversed polarity to the forward polarity. Further, arc extinction at the time of switching to the reversed polarity is prevented by increasing the charging amount of the restriking capacitor 62. This may be achieved by setting the polarity switching current value for switching to the reversed polarity larger than the absolute value of the polarity switching current value for switching to the forward polarity and thereby increasing the surge voltage applied at the time of switching to the reversed polarity.

Although the above description of the first through the third embodiments relate to the welding power supplies A1-A3 used for a TIG welding system, the present disclosure is not limited to this. The welding power supply according to the present disclosure maybe used for other semiautomatic welding systems. Also, the welding power supply according to the present disclosure may be used for a fully automatic welding system using a robot or a shielded metal arc welding system.

The welding power supply according to the present disclosure is not limited to the foregoing embodiments. The specific configuration of each part of the welding power supply of the present disclosure may be varied in many ways.

The invention claimed is:

1. A welding power supply for applying an alternating voltage across a welding electrode and a workpiece, comprising:
    a DC power supply circuit that outputs DC power;
    a first inverter circuit provided with a plurality of switching elements, the first inverter circuit being configured to receive the DC power from the DC power supply circuit to output AC power;
    a current sensor that detects output current from the first inverter circuit; and
    a controlling circuit that controls the DC power supply circuit and the first inverter circuit;
    wherein, in switching an output polarity of the first inverter circuit, the controlling circuit is configured to in a single switching operation of output polarity of the first inverter circuit: (1) stop an output of the DC power supply circuit to the first inverter circuit; (2) then provide a short-circuit state of the output of the DC power supply circuit by setting all of the switching elements to ON, whereby the output current decreases during the short-circuit state; and (3) then switch one of the switching elements that was ON before the short-circuit state to OFF while simultaneously restarting the output of the DC power supply circuit to the first inverter circuit when an absolute value of an instantaneous value of the output current decreases to or below a first threshold value,
    wherein the plurality of switching elements comprise at least a first switching element and a second switching element, and
    in switching a state with the first switching element being ON to another state with the second switching element being ON, the controlling circuit is configured to:
    set the first switching element to ON and set the second switching element to OFF in a period after the output of the DC power supply circuit is stopped as recited in (1) and before the short-circuit state is provided as recited in (2);
    set both the first switching element and the second switching element to ON in a period after the short-circuit state is provided as recited in (2) and before the absolute value of the instantaneous value of the output current decreases to or below the first threshold value as recited in (3); and
    set the first switching element to OFF and keep the second switching element to ON in a period after the absolute value of the instantaneous value of the output current decreases to or below the first threshold value as recited in (3) and the output of the DC power supply circuit to the first inverter circuit is restarted.

2. The welding power supply according to claim 1, wherein the DC power supply circuit includes a second inverter circuit, and
    the controlling circuit is configured to stop the output of the DC power supply circuit by stopping switching of the second inverter circuit.

3. The welding power supply according to claim 1, wherein the controlling circuit is configured to provide the short-circuit state when the absolute value of the instantaneous value of the output current decreases to or below a second threshold after terminating the output of the DC power supply circuit.

4. The welding power supply according to claim 3, further comprising a voltage sensor that detects an output voltage of the first inverter circuit, wherein the controlling circuit is configured to change the first threshold in accordance with the output voltage.

5. The welding power supply according to claim 4, wherein the second threshold changes in relation to the first threshold.

6. The welding power supply according to claim 1, wherein the controlling circuit is configured to change the first threshold to different values for a case where the output polarity is switched from a forward polarity to a reversed polarity and for a case where the output polarity is switched from the reversed polarity to the forward polarity, the forward polarity being a state in which a potential of the workpiece is higher than that of the welding electrode, the reversed polarity being a state in which the potential of the workpiece is lower than that of the welding electrode.

* * * * *